Aug. 11, 1964  C. H. Q. FIFIELD  3,144,394
FUEL ELEMENTS FOR NUCLEAR REACTORS
Filed May 21, 1962  2 Sheets-Sheet 1
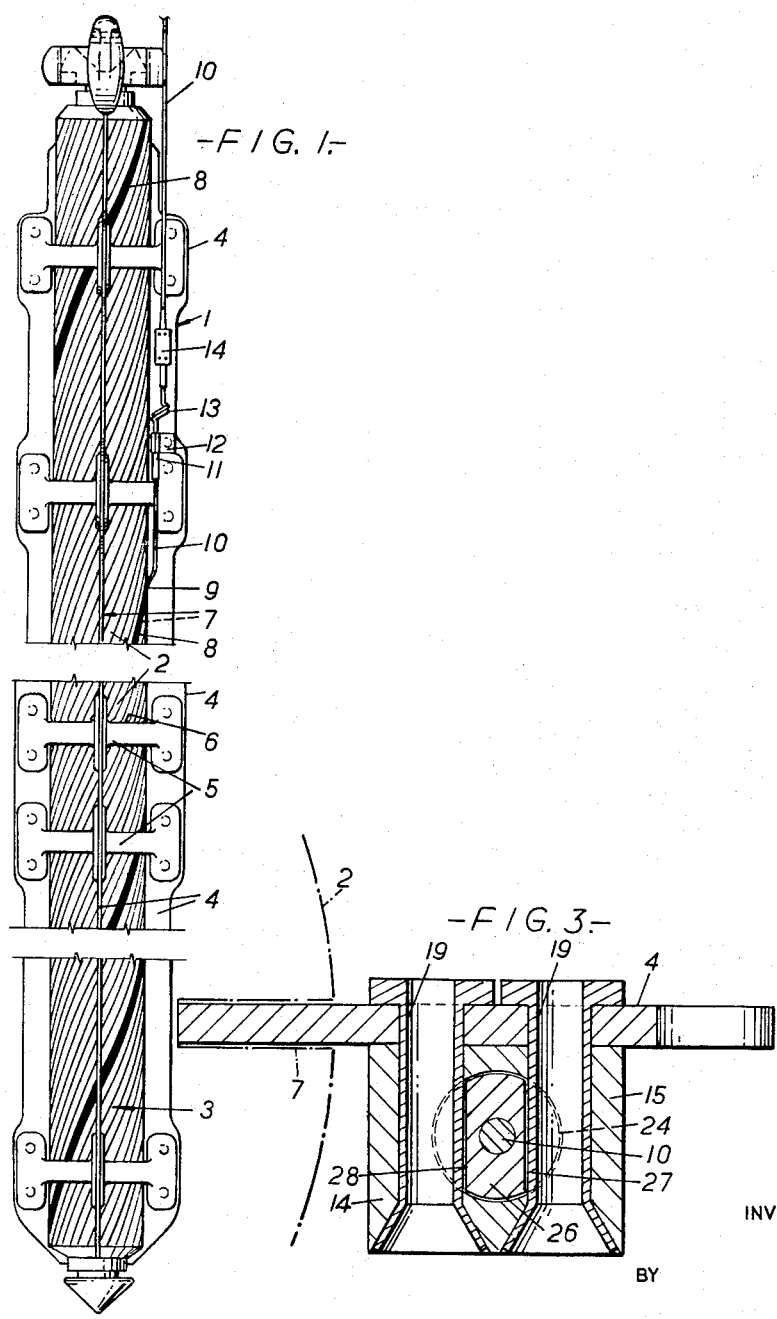
INVENTOR:
BY Aug. 11, 1964
C. H. Q. FIFIELD
3,144,394
FUEL ELEMENTS FOR NUCLEAR REACTORS
Filed May 21, 1962
2 Sheets-Sheet 2
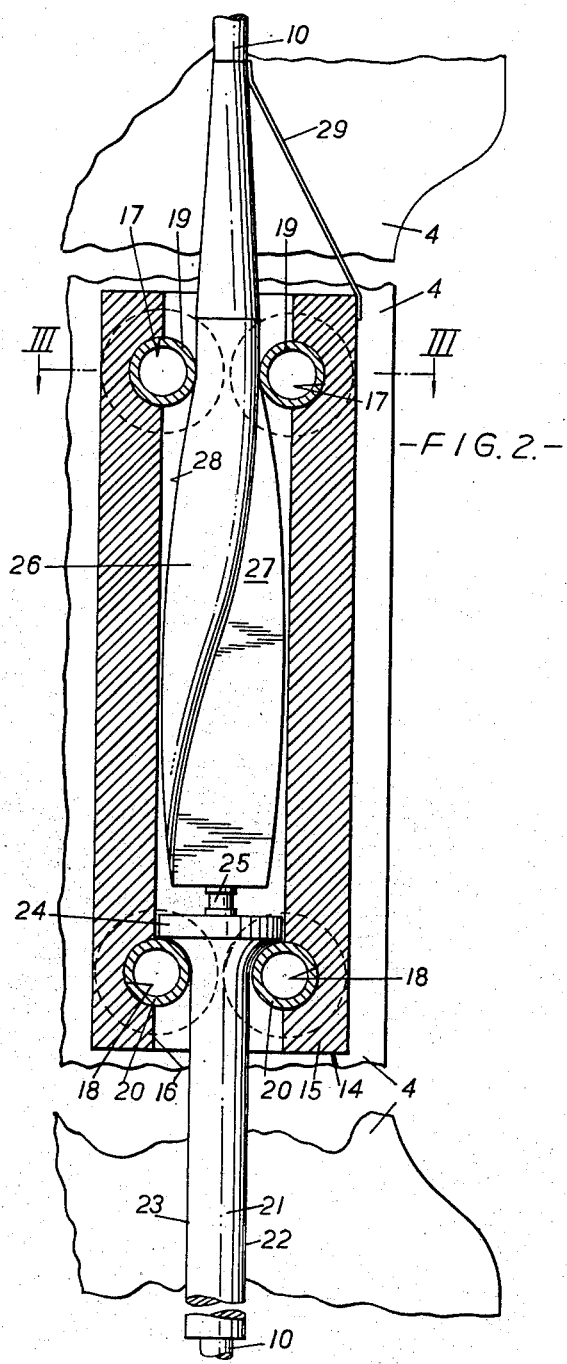
INVENTOR:
BY

United States Patent Office 3,144,394
Patented Aug. 11, 1964

3,144,394
FUEL ELEMENTS FOR NUCLEAR REACTORS
Charles Herbert Quinton Fifield, Lea, near Preston, England, assignor to United Kingdom Atomic Energy Authority, London, England
Filed May 21, 1962, Ser. No. 196,160
Claims priority, application Great Britain May 4, 1962
3 Claims. (Cl. 176—68)

This invention relates to fuel elements for nuclear reactors and is concerned with such fuel elements having thermocouple cables attached thereto for measuring the temperature of the fuel element whilst loaded in a nuclear reactor.

In the patent application relating to nuclear reactor fuel elements, inventor P. P. Guneratne, based on U.S. patent application Serial No. 196,166, and filed on the same date as the present application, there is described a nuclear reactor fuel element having a thermocouple cable attached thereto, the cable having a portion of reduced cross-section at which the cable breaks preferentially on pulling on the cable.

According to the present invention, a nuclear reactor fuel element having attached thereto a thermocouple cable of which a portion is of reduced cross-section has means for applying torsion to the said portion of cable, said means being operated on pulling on the cable, whereby the cable becomes sheared at the said portion.

An embodiment of the invention will now be described by way of example with reference to the accompanying diagrammatic drawings, wherein:

FIGURE 1 is a fragmentary side elevation of a nuclear reactor fuel element,

FIGURE 2 is an enlarged side view partly in medial section and illustrating a detail, and FIGURE 3 is an end view in section on line III—III of FIGURE 2.

Referring to FIGURE 1 of the drawing, a fuel element 1 for a gas-cooled nuclear reactor such as that at Bradwell, Essex, has helical heat transfer fins 2 provided on its sheath 3 and also has four longitudinal splitter fins 4 equally spaced round the fuel element 1, the splitter fins 4 being connected by braces 5 welded thereto, one of the braces being accommodated in a circumferential groove 6 in the heat transfer fins 2 so as longitudinally to locate the splitter and brace assembly in correct position on the fuel element. Each splitter fin 4 is located in a longitudinal groove 7 in the heat transfer fins 2 to prevent rotation of the said assembly relative to the fuel element. FIGURE 3 illustrates in dot and dash lines a typical longitudinal groove.

The fuel element 1 is intended to provide for temperature measurement during operation and to this end has a thickened heat transfer fin 8 within which at 9 is provided an aperture containing a thermocouple hot junction. The accommodation of the thermocouple hot junction may be as shown in British Patent No. 806,490 except that instead of providing a thickened wall of the sheath as shown therein, the thickened fin 8 shown in the present FIGURE 1 is provided to serve the same purpose, and the aperture 9 is a blind-ended hole in the fin 8. A thermocouple cable 10 extends from the hot junction along one of the splitter fins 4, is guided by a sleeve 11 secured by a plate 12 spot welded to the said splitter fin 4, has a slack portion taken up by kinking the cable at 13, and extends to a device 14 attached to the said splitter fin 4 at a position where the splitter fin is of slightly reduced radial width.

The device 14 is shown more particularly in FIGURES 2 and 3. It comprises a body 15 having a longitudinal centrally-disposed circular-section aperture 16 and further provided with two pairs of lateral apertures 17, 18 respectively, the latter accommodating tubular flat-headed rivets 19, 20 respectively by means of which the body 15 is secured to the splitter fin 4, the tails of the rivets being opened out to engage divergent portions of the apertures 17, 18 as can clearly be seen in FIGURE 3. The aperture 16 accommodates a ferrule 21 secured to the cable 10 as by brazing or crimping, the ferrule having flats 22, 23 engaged by the pair of rivets 20 and also having a circular section head 24 slidable in the aperture 16 but prevented from withdrawal from the body 15 by the pair of rivets 20. The portion of the cable 10 which projects from the ferrule 21 is reduced in cross-section over a small part 25 of its length, for example by swaging or by machining of a longitudinal V or U groove, and the following part of normal cross section has a ferrule 26 secured to it as by brazing or crimping. The ferrule 26 is similar to the ferrule 21 except that it has no circular-section head and that it is twisted through about 120° where its major diameter slidably engages the aperture 16 and the thickness across flats 27, 28 or the rivet 26 is such as to be engageable by the pair of rivets 19. Consequently, on being withdrawn from the body 15 on pull being applied to that part of the cable 10 which extends upwardly through the reactor channel in which the fuel element is disposed and to the charge face of the reactor, the ferrule 26 is caused to rotate by engagement of the pair of rivets 19 with the twisted flats 27, 28. The ferrule 21 is, however, held against rotation by engagement of the pair of rivets 20 with its non-twisted flats 22, 23 but is able to be moved axially in the aperture 16, the kinks at 13 allowing such movement. The result is to apply torsion to the reduced portion 25 of the cable 10 and to shear it. The ferrule 26 is able to be withdrawn from the body 15 and be removed with the remainder of the cable. That part of the cable remaining on the fuel element has no loose end which may interfere with discharging of the fuel element from its channel, since the ferrule 21 is prevented from leaving the body 15 at either end by the two pairs of rivets 19, 20.

In order to prevent inopportune or premature operation of the device 14, a safety wire 29 is preferably provided between the ferrule 26 and the body 15.

In a modification (not shown), the thermocouple hot junction may be provided in the fuel member contained in the fuel element sheath, for example as described, and as shown in FIGURE 2, of British Patent No. 844,211.

Typically, a theromocouple cable is .0625" in diameter and is reduced to a diameter of .045" over a length of ¼".

I claim:

1. A nuclear reactor fuel element including a thermocouple cable extending from a thermocouple hot junction for measuring fuel element temperature, a portion of said thermocouple cable being of reduced diameter, and means on said fuel element for applying torsion to said portion of cable, said means being operated by pulling on the cable whereby the cable becomes sheared at the said portion.

2. A nuclear reactor fuel element according to claim 1, wherein said means for applying torsion comprises a body secured to a part of said fuel element, a ferrule secured to said thermocouple cable ajacent said portion of reduced diameter and adapted to fit within an aperture in said body, a second ferrule secured to said thermocouple cable adjacent said portion of reduced diameter, spaced from the first-named ferrule by said portion and adapted to fit within said aperture, means associated with said body for restraining said first-named ferrule against rotary movement relative to said body, and means associated with said body for causing rotary movement of said second ferrule relative to said body on pull being applied thereto via said cable in a direction away from said reduced portion.

3. A nuclear reactor fuel element according to claim 2, wherein said means for restraining rotary movement of said first-named ferrule relative to said body serves also to permit longitudinal movement of said first-named ferrule relative to said body but prevents said first-named ferrule from being completely withdrawn from said body, and wherein said means for causing rotary movement of said second ferrule relative to said body also permits longitudinal movement of said second ferrule relative to said body and permits withdrawal of said second ferrule from said body, whereby, on pull being applied to said second ferrule via said cable to cause shearing at said portion of reduced diameter, said second ferrule can be withdrawn with one part of the cable from said body whilst the first-named ferrule attached to the remaining part of the cable is retained against complete removal from said body, thereby precluding that part of the thermocouple cable remaining on the fuel element from interfering with subsequent handling operations on the fuel element.

References Cited in the file of this patent

UNITED STATES PATENTS

| | | |
|---|---|---|
| 2,985,575 | Dennis et al. | May 23, 1961 |
| 3,000,803 | Morris et al. | Sept. 19, 1961 |
| 3,051,641 | Guneratne et al. | Aug. 28, 1962 |

FOREIGN PATENTS

| | | |
|---|---|---|
| 844,211 | Great Britain | Aug. 10, 1960 |